United States Patent
Eide et al.

(10) Patent No.: US 9,478,872 B2
(45) Date of Patent: Oct. 25, 2016

(54) GROUND PENETRATING RADAR ANTENNA

(71) Applicant: 3d-radar as, Trondheim (NO)

(72) Inventors: Egil Eide, Tiller (NO); Jukka Typpo, Trondheim (NO)

(73) Assignee: 3D-RADAR AS, Trondheim (NO)

( * ) Notice: Subject to any disclaimer, the term of this patent is extended or adjusted under 35 U.S.C. 154(b) by 46 days.

(21) Appl. No.: 14/349,373

(22) PCT Filed: Oct. 4, 2012

(86) PCT No.: PCT/NO2012/050193
§ 371 (c)(1),
(2) Date: Apr. 3, 2014

(87) PCT Pub. No.: WO2013/051945
PCT Pub. Date: Apr. 11, 2013

(65) Prior Publication Data
US 2014/0240196 A1    Aug. 28, 2014

(30) Foreign Application Priority Data
Oct. 7, 2011    (NO) .................................. 20111363

(51) Int. Cl.
*H01Q 21/28* (2006.01)
*G01V 3/12* (2006.01)
(Continued)

(52) U.S. Cl.
CPC .............. *H01Q 21/28* (2013.01); *G01V 3/12* (2013.01); *H01Q 1/38* (2013.01); *H01Q 9/30* (2013.01); *H01Q 9/44* (2013.01); *H01Q 21/06* (2013.01); *H01Q 25/00* (2013.01); *H01Q 3/01* (2013.01); *H01Q 21/12* (2013.01)

(58) Field of Classification Search
CPC ...... H01Q 25/00; H01Q 21/28; H01Q 21/06; H01Q 21/12; G01V 3/12
See application file for complete search history.

(56) References Cited

U.S. PATENT DOCUMENTS 6,670,906 B1    12/2003    Roberts et al.
7,170,449 B2    1/2007    Eide
(Continued)

FOREIGN PATENT DOCUMENTS

CN    102185176 A    9/2011
EP    0500380 A1    8/1992
(Continued)

OTHER PUBLICATIONS

International Search Report from application No. PCT/NO2012/050193, dated Dec. 14, 2012, 3 pages.
(Continued)

*Primary Examiner* — Hoanganh Le
(74) *Attorney, Agent, or Firm* — Rothwell, Figg, Ernst & Manbeck PC

(57) ABSTRACT

An antenna system for ground penetrating radar, comprising at least one transmitter antenna (1) and at least one receiver antenna (2), where the transmitter antenna and receiving antennas are mounted on their own downwards sloping ground plane (5) in order form a V-shaped wedge with the tip pointed down towards the ground (10) during normal operation, where said antennas comprise of triangular or V-shaped monopoles made by applying metal surfaces on a sheet carrier (3) of a glass fiber substrate placed on the underside of a layer of a radar absorbing material (4), where the top side of the material layer is covered by a metallic ground plane (5).

8 Claims, 2 Drawing Sheets

(51) Int. Cl.
*H01Q 1/38* (2006.01)
*H01Q 9/44* (2006.01)
*H01Q 9/30* (2006.01)
*H01Q 21/06* (2006.01)
*H01Q 25/00* (2006.01)
*H01Q 3/01* (2006.01)
*H01Q 21/12* (2006.01)

(56) References Cited

U.S. PATENT DOCUMENTS

| | | | |
|---|---|---|---|
| 2006/0012525 A1* | 1/2006 | Eide | G01V 3/12 343/700 MS |
| 2007/0159400 A1* | 7/2007 | DeJean | H01Q 1/243 343/700 MS |
| 2009/0102729 A1 | 4/2009 | Wang et al. | |
| 2009/0195459 A1* | 8/2009 | Chua | H01P 3/081 343/700 MS |
| 2011/0169707 A1 | 7/2011 | Van Gils | |
| 2014/0306846 A1* | 10/2014 | Nakatsu | H01Q 21/0075 343/700 MS |

FOREIGN PATENT DOCUMENTS

| | | |
|---|---|---|
| EP | 1542314 A1 | 6/2005 |
| EP | 1558946 A1 | 8/2005 |
| JP | H08105962 A | 4/1996 |
| JP | 2007201868 A | 8/2007 |
| WO | 0161784 A1 | 8/2001 |
| WO | 2004042427 A1 | 5/2004 |
| WO | 2010151125 A1 | 12/2010 |

OTHER PUBLICATIONS

English translation of Notification of Reasons for Rejection issued in Japanese Patent Application No. 2014-534509, 2 pages (May 12, 2015).

Hertl, I. et al., UWB Antennas for Ground Penetrating Radar Application, Applied Electromagnetics and Communications, ICECOM, 19th International Conference, IEEE, Piscataway; NJ, USA (Sep. 24, 2007).

Examination Report issued in Australian Patent Application No. 2012319274, 2 pages (Jan. 11, 2016).

Notice of Acceptance issued in Australian Patent Application No. 2012319274, 2 pages (May 4, 2016).

Office Action with Search Report (and English translation) issued in Chinese Patent Application No. 201280045740.6, 10 pages (Dec. 31, 2014).

Office Action (and English translation) issued in Chinese Patent Application No. 201280045740.6, 4 pages (Aug. 4, 2015).

Notice of Grant (and English translation) issued in Chinese Patent Application No. 201280045740.6, 3 pages (Feb. 4, 2016).

Notice of Allowance (and English translation) issued in Japanese Patent Application No. 2014-534509, 2 pages (Apr. 12, 2016).

Extended European Search issued in European Patent Application No. 12838565.5, 6 pages (Nov. 12, 2015).

International Search Report and Written Opinion issued in International Patent Application No. PCT/NO2012/050193, 7 pages (Dec. 14, 2012).

International Preliminary Report on Patentability issued in International Patent Application No. PCT/NO2012/050193, 5 pages (Apr. 8, 2014).

* cited by examiner

GROUND PENETRATING RADAR ANTENNA

CROSS REFERENCE TO RELATED APPLICATION(S)

This application is a 35 U.S.C. §371 National Phase Entry Application from PCT/NO2012/050193 filed Oct. 4, 2012, and also claims priority to Norwegian application no. 20111363 filed Oct. 7, 2011, the disclosures of which are incorporated herein by reference.

THE TECHNICAL FIELD OF THE INVENTION

The present invention comprises an antenna system for ground penetrating radar, where the transmitted electromagnetic waves primarily radiate down into the ground.

KNOWN ART OF THE FIELD

A ground penetrating radar is a type of radar which transmits electromagnetic waves (radio waves) down into the ground, and measures the reflection from objects or stratifications underground. The antenna for this type of radar must cause the transmitted signal to penetrate down into the ground in the best manner possible. Thus, the antenna should be placed in close proximity to the ground. To attain sufficient isolation between the radar transmitter and receiver, separate transmitter and receiver units are usually employed and mounted next to each other.

So-called "bowtie" antennas have been employed for several uses where a broad bandwidth is needed. The best known article describing such antennas was published by G. H. Brown and O. M. Woodward in RCA Review, pg. 425-452, in December 1952. Since then many articles have been published regarding variants of this type of antenna. For ground penetrating radars, it has been usual to employ bowtie dipoles, but these antennas require so-called "balun" (balanced-to-unbalanced) transformers in order to operate satisfactory. In year 2000 E. S. Eide published an article in IEE Transactions on Microwave, Antennas and Propagation, Vol. 147, No. 3, disclosing a new antenna system comprised of a couple of bowtie monopoles, mounted on the bottom side of a V-shaped ground plane. Since the antenna system comprised monopoles instead of dipoles, the antenna was no longer dependent on baluns. The shape of the ground plane does however cause relatively large amounts of lossy material (absorbers) to be used in order to fill in the space between the ground plane and the antenna elements.

A further development of the antenna is patented as Norwegian patent no. 316,658, European patent no. 1,558, 946, and U.S. Pat. No. 7,170,449. According to this patent, the transmitter and receiver antennas are mounted on a common ground plane connected by a hinge that makes it possible to adjust the angle α between the antennas to an optimal value. The downside of this construction is, however, that part of the radar signal from the transmitter antenna is reflected at the receiving antenna that is located opposite the transmitter antenna, before it enters the ground. Thus, an undesired double pulse is created, which reduce the ability of the radar to separate close laying objects. In addition, the radar waves which are reflected upwards form the ground itself will be reflected one additional time by the antenna construction, which due to the connected ground planes constitutes a so-called corner reflector. The reflected signals will again enter the ground and generate so-called multiple signals, which reduces the fidelity of the radar image. A third disadvantage of the construction is that it gives a strong direct wave from the transmitter antenna to the receiver antenna because these antennas are located opposite to each other.

SHORT DESCRIPTION OF THE INVENTION

The antenna is now further developed to a new antenna system in accordance with the present invention, which discloses a new and improved solution to the above mentioned.

It is an object of the present invention to bring forth an antenna which gives a radar signal of a higher quality than the preceding antenna system. The present invention allows for a considerable suppression of the direct wave from the transmitter antenna to the receiver antenna, approximately complete elimination of the double pulse, and considerable suppression of multiples between antenna and ground surface.

Another object of the present invention is to enable a simpler and more stable mechanical construction of the antenna system. The characteristic features of the antenna system in accordance with the present invention are apparent in independent claim 1. Additional features are given by the dependent claims.

The antenna system for ground penetrating radar in accordance with the invention comprises two sheet like antenna arrangements, where the two antenna arrangements respectively comprises at least one transmitter antenna and at least one receiver antenna. The antennas in each antenna arrangement consist of monopoles formed by applying metal surfaces to an electrical insulating carrier sheet which is located on the underside of a layer of a radar absorbing material, where the top side of the material layer is covered by a metallic ground plane. It is advantageous for the antenna arrangements to be arranged in order to have a downwards sloping position from the feeding points, in order for the antenna arrangements to form a V-shaped wedge with the tip pointed down towards the ground during normal operation. In addition, it is advantageous for the ground planes not to be in electric connection with each other.

According to a preferred embodiment the transmitter antenna and receiver antenna are mainly V-shaped.

According to one embodiment an angle ($\alpha$) in the vertical plane between the two antenna arrangements may be adjusted by use of a non-conducting hinge connecting said ground planes mechanically to each other.

The terminal points of the antennas (located in the antennas outermost parts when seen from the feeding point) are typically connected to the ground plane through resistors and spacers. In addition, it is an advantage for the terminal points of the transmitter antenna to be directed towards the terminal points of the receiver antenna.

According to an embodiment, the antenna system may comprise a plurality of transmitter antennas and a plurality of receiver antennas, making up a linear array of antennas distributed along the symmetry axis between the two antenna arrangements.

The radar absorbing material may consist of one or more resistant layers. The sheet carrier can be a laminate, especially a circuit board laminate, preferably consisting of a glass fibre substrate.

SHORT DESCRIPTION OF THE FIGURES

The present invention will now be described closer with reference to the enclosed drawings, where:

DETAILED DESCRIPTION OF THE PRESENT INVENTION

Figure 1:
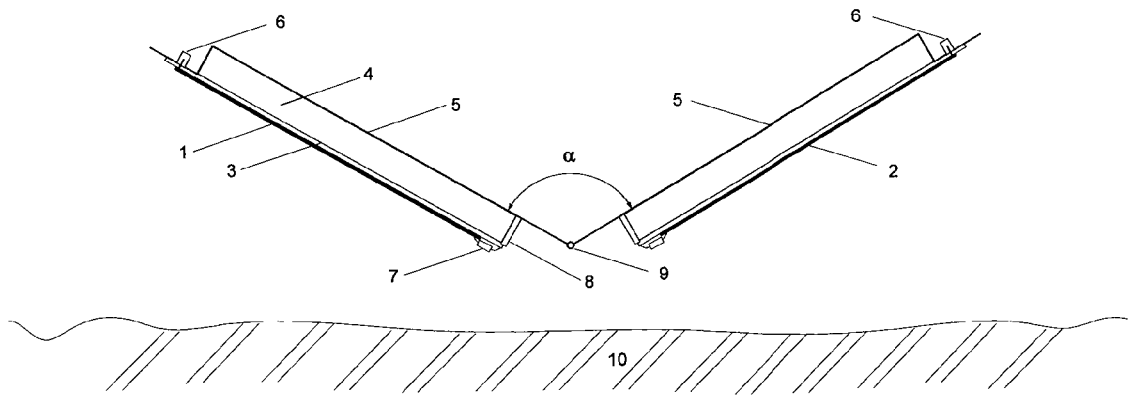
FIG. 1 shows a cross-section of the antenna system seen from the side.

FIG. 1 shows an antenna system consisting of two antenna arrangements for respectively sending and receiving as described below. The transmitter antennas and receiver antennas (1-2) consists of monopoles made from electrically conductive material on an electrically insulating sheet carrier (3), that may e.g. be a 1.55 mm thick circuit board laminate of the type FR-4. The monopoles may for example be triangularly shaped or V-shaped for optimal impedance matching to the feeding point (6). The circuit board laminates (3) are located on the underside of the sheet consisting of a absorbing material (4) that absorbs radio waves. This could either be a material consisting of thin resistive layers, or it could be radar absorbing material e.g. of the type Eccosorb AN79 from Emerson and Cuming. The absorbing material is placed on an underlying ground plane (5) consisting of metal. The antennas (1-2) for transmitting and receiving are constructed the same way. Each of the antennas are fed by means of a coaxial cable at the feeding point (6), where the centre line of the coaxial cable is connected to the antenna (1,2), and the screen is connected to the ground plane (5). The antennas outer parts, which hereafter are called the terminal points, are connected to the ground plane through a resistor (7) of e.g. 50 ohm, which is mounted on the ground plane (5). The antenna arrangements are arranged to form a V-shaped wedge with the tip pointed down towards the ground.

During operation the antennas terminal points are closest to the ground (10), and the spacers (8) provide mechanical attachment of the circuit board laminate (3) to the ground plane (5). The two parts of the ground plane are in this example connected to each other by means of a non-conductive hinge (9), which enables adjustment of the angle $\alpha$ between the antennas to an optimal value. It is an essential feature of the present invention that the ground planes for transmitter antenna and receiver antenna respectively does not have an electrical connection with each other. Another feature of the invention is that the terminal points of the antennas are pointed at each other instead of the furthest possible away from each other. The optimal value for the angle $\alpha$ will vary from measuring problem to measuring problem, and the soil dielectric characteristics will be the deciding factor. During operation the antennas will be arranged to have a downwards sloping position from the feed point (6).

Figure 2:
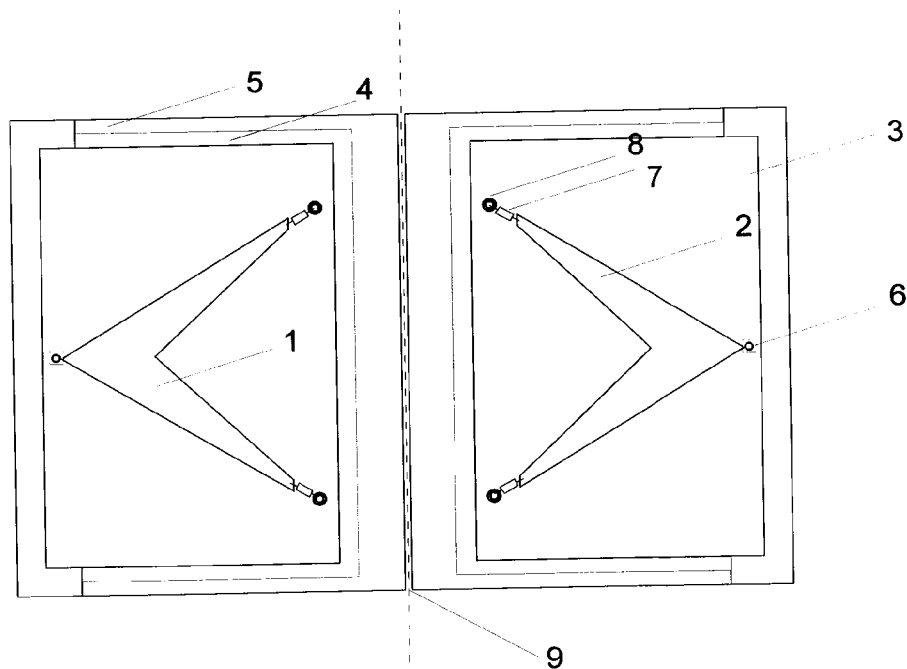
FIG. 2 shows an embodiment of the antenna system according to the present invention seen from the underside.

FIG. 2 shows an embodiment of the antenna system from below, where the transmitting antenna and receiving antenna (1-2) are V-shaped with a resistor (7) and metallic spacers to the ground plane (8) located the furthest away from the feed point (6).

Figure 3:
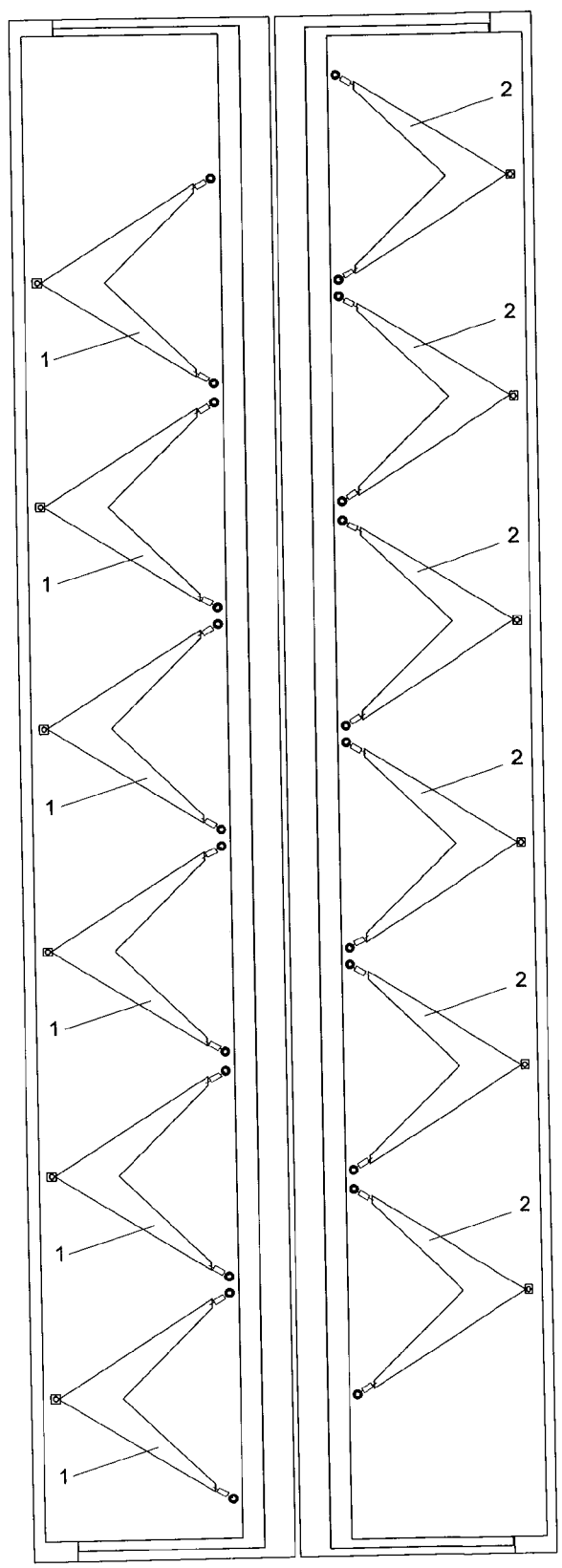
FIG. 3 shows an embodiment of the antenna system in accordance with the present invention where several transmitter antenna and several receiver antenna are distributed along the symmetry axis of the antenna system.

Another embodiment of the antenna system according to the present invention is shown in FIG. 3. Said figure shows a linear antenna array comprising several transmitter antennas and several receiver antennas distributed along the antenna system's symmetrical axis, which runs through the hinge (9) at the bottom of the tip of the V-shaped wedge.

The invention claimed is:

1. An antenna system for ground penetrating radar, where said antenna system comprises two sheet antenna arrangements, where said two antenna arrangements respectively comprises at least one transmitter antenna and at least one receiver antenna, where said antennas each antenna arrangement consist of monopoles formed by applying metal structures on an electrical insulating sheet carrier located on the underside of a layer of a radar absorbing material, where the top side of the material layer is covered by a metallic ground plane, characterized by that said antenna arrangements are arranged in order to have a downwards sloping position from feeding points of the antennas in order for the antenna arrangements to form a V-shaped wedge with the tip pointed down towards the ground during normal operation, where said ground planes are not in electric connection with each other.

2. The antenna system in accordance with claim 1, where the antennas are essentially V-shaped.

3. The antenna system in accordance with claim 1, where the radar absorbing material consists of one or more layers.

4. The antenna system in accordance with claim 1, where the angle in the vertical plane between the two antenna arrangements may be adjusted by use of a non-conducting hinge connecting said ground planes mechanically to each other.

5. The antenna system in accordance with claim 1, where the terminal points of the antennas are connected to the ground plane through a resistor and spacers.

6. The antenna system in accordance with claim 1, where the terminal points of the transmitter antenna are directed towards the terminal points of the receiver antenna.

7. The antenna system in accordance with claim 1, comprising a plurality of transmitter antennas and a plurality of receiver antennas, forming a linear array of antennas distributed along the symmetry axis between the two antenna arrangements.

8. The antenna system in accordance with claim 1, where the sheet carrier comprises a circuit board laminate comprising a glass fibre substrate.

* * * * *